Sept. 30, 1969    A. WINKLER ET AL    3,469,906
MOVIE CAMERA
Filed Sept. 30, 1965    2 Sheets-Sheet 1
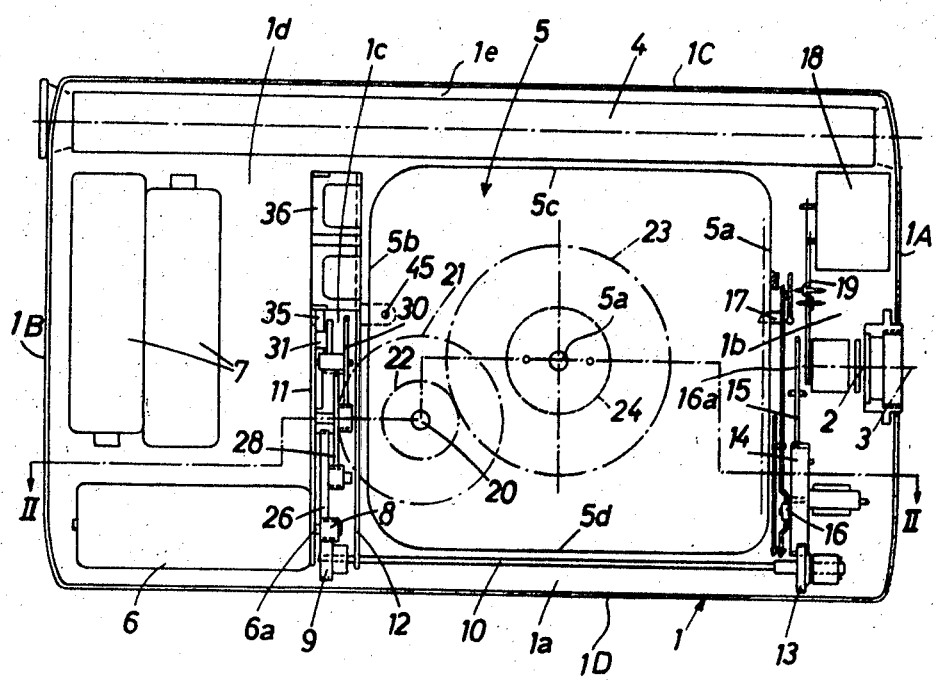
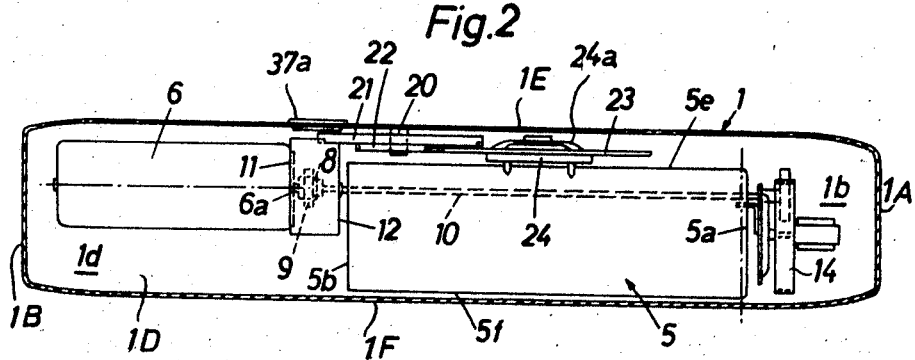
INVENTORS
ALFRED WINKLER
RICHARD DENK
BY Michael S. Striker

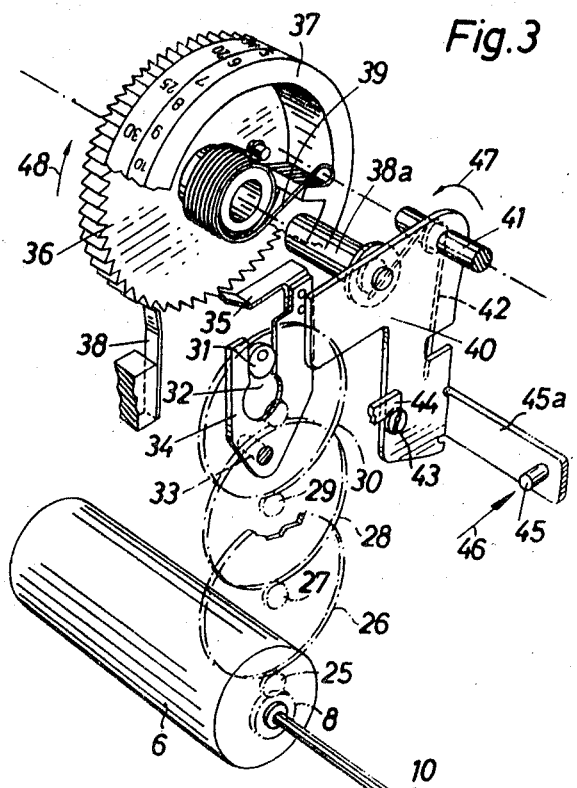
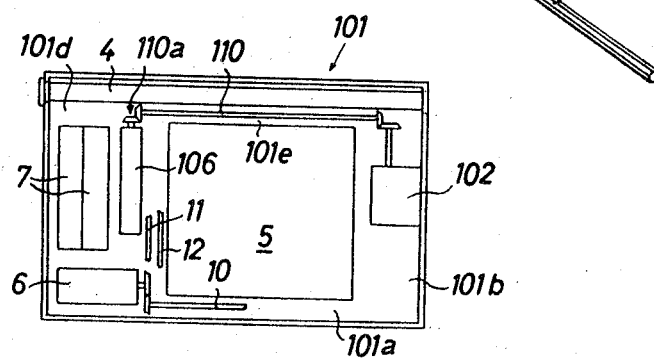

United States Patent Office 3,469,906
Patented Sept. 30, 1969

3,469,906
MOVIE CAMERA
Alfred Winkler and Richard Denk, Munich, Germany, assignors to Agfa-Gevaert Aktiengesellschaft, Leverkusen, Germany
Filed Sept. 30, 1965, Ser. No. 491,626
Claims priority, application Germany, Oct. 7, 1964, A 47,277
Int. Cl. G03b 23/02, 3/00
U.S. Cl. 352—72                                13 Claims

ABSTRACT OF THE DISCLOSURE

A portable motion picture camera for Super-8 film comprises a flat rectangular pocket-sized housing wherein the motor which drives the shutter and the film transporting mechanism is located in a rear compartment adjacent to a narrow rear wall of the housing. The lens, shutter and film transporting mechanism are mounted in a front compartment which is adjacent to a narrow front wall of the housing and is separated from the rear compartment by a space which can receive a magazine with coaxial film supply and takeup means. A horizontal drive shaft which connects the motor with the shutter and with the film transporting mechanism extends in parallelism with the optical axis of the lens at a level below the space for the magazine. The film frame counter is located in the rear compartment which latter further accommodates a portion of a transmission which connects the motor with the takeup means of a magazine in the space.

---

The present invention relates to cameras in general, and more particularly to improvements in movie cameras. Still more particularly, the invention relates to improvements in portable movie cameras of the type wherein the shutter mechanism and/or the film transporting mechanism is operated by an electric motor.

Conventional movie cameras with battery-operated electric motors are rather bulky and unwieldy because their housing must accommodate the motor and one or more batteries. Proposals to install the batteries in the handle have met with limited success because the camera cannot be operated if the handle is detached from its housing.

It is an important object of the present invention to provide a portable movie camera with a prime mover including a battery-operated electric motor wherein all components of the prime mover are accommodated in the housing without, however, appreciably adding to the bulkiness of the housing.

Another object of the invention is to provide a movie camera of the just outlined characteristics which can be operated with or without a handle and wherein all such transmissions which receive motion from the prime mover to operate the shutter mechanism, the film transporting mechanism, the frame counter, the film convoluting mechanism and, if necessary, the mechanism for changing the focal length of the lens, occupy very little room.

A further object of the invention is to provide a low-cost movie camera whose housing is configurated and dimensioned in such a way that it may be accommodated in a very simple and exceptionally small carrying case.

An additional object of the instant invention is to provide simple, inexpensive and easy-to-install transmissions between the prime mover and the driven mechanisms of a movie camera which embodies the above-outlined features and advantages.

A concomitant object of the invention is to provide a very simple and compact film magazine which may be used in a movie camera of the above outlined type and to install the magazine in the camera housing in such a way that insertion or removal of magazine triggers certain operations which contribute to the reliability and versatility of the camera.

Briefly stated, one feature of our present invention resides in the provision of a movie camera which comprises a housing having relatively narrow but elongated front and rear walls, a lens mounted in the housing in the region of the front wall, a film magazine removably received in the housing between the lens and the rear wall and having a relatively narrow but elongated rear side which faces toward but is spaced from the rear wall, and a prime mover including an electric motor and at least one battery or another suitable source of electrical energy. The prime mover is mounted in a compartment between the rear side of the magazine and the rear wall of the housing. This compartment may also accommodate a second prime mover which serves to change the focal length of the lens if the camera is provided with a zoom lens, and the same compartment may further accommodate suitable partitioning means for mounting various component parts of transmissions which are provided to operate the shutter mechanism, the film transporting mechanism, the core which supports convoluted film in the magazine, and a frame counter.

The shutter mechanism and the film transporting mechanism are mounted in a front compartment which extends between the front wall of the housing and a relatively narrow but elongated front side of the magazine. This front compartment also accommodates the lens or a portion of the lens. In order to provide room for the transmission means between the output shaft of the electric motor and the two mechanisms in the front compartment, the upper side or the underside of the magazine may be slightly spaced from the respective wall of the housing to define therewith an elongated passage which is parallel to the optical axis and which may accommodate an elongated shaft driven by the motor and arranged to operate the transmission means for the two mechanisms.

The novel features which are considered as characteristic of the invention are set forth in particular in the appended claims. The improved movie camera itself, however, both as to its construction and its mode of operation, together with additional features and advantages thereof, will be best understood upon perusal of the following detailed description of certain specific embodiments with reference to the accompanying drawings, in which:

FIG. 1 is a somewhat diagrammatic side elevational view of a movie camera which embodies one form of our invention and which is shown in actual size, one lateral wall of the housing having been omitted to show the distribution of various components in the interior of the camera;

FIG. 2 is a horizontal section substantially as seen in the direction of arrows from the line II—II of FIG. 1;

FIG. 3 is an exploded perspective view of the frame counter which forms part of the camera shown in FIGS. 1 and 2, further showing the transmission which drives the frame counter; and FIG. 4 is a diagrammatic side elevational view of a modified movie camera which is provided with a zoom lens and comprises two prime movers one of which serves to change the focal length of the lens.

Referring first to FIGS. 1 and 2, there is shown a movie camera which comprises a flat substantially rectangular or brick-shaped housing 1 having relatively narrow but elongated vertically extending front and rear walls 1A, 1B, relatively narrow but elongated horizontally extending top and bottom walls 1C, 1D, and two lateral walls 1E, 1F. These walls define between themselves a relatively narrow but rather long and high internal space which accommodates a large number of components including a lens 2 having a horizontal optical axis 3 and being mounted in the region of the front wall 1A. The numeral 4 denotes an elongated view finder which extends in the housing 1 between the front and rear walls 1A, 1B and through a horizontal passage 1e adjacent to the inner side of the top wall 1C. The passage 1e is parallel with the optical axis 3 and extends along the upper side 5c of a flat rectangular film cartridge 5 which is removably inserted into the housing 1 through a suitable door or closure (not shown) provided in the lateral wall 1F. The upper side 5c of the magazine 5 is elongated but narrow and is parallel or substantially parallel with the underside 5d which latter is spaced from and defines an elongated passage 1a with the bottom wall 1D. The magazine 5 further comprises relatively narrow but elongated front and rear sides 5a, 5b and two rectangular lateral sides 5e, 5f. The sides 5a, 5b are normal or nearly normal and the sides 5c, 5d are parallel or nearly parallel with the optical axis 3. The film gate (not shown) is preferably provided on the magazine 5 so that the camera is ready for use as soon as the magazine is inserted into the housing 1 to assume the position shown in FIGS. 1 and 2. The height of the passage 1e is just sufficient to accommodate the viewfinder 4 and, as stated above, the latter is parallel with the optical axis 3.

In accordance with an important feature of our present invention, and in order to reduce the dimensions of the camera to a minimum, the prime mover of the camera is accommodated in a rear compartment 1d extending between the relatively narrow rear side 5b of the magazine 5 and the relatively narrow rear wall 1B of the housing 1. This prime mover comprises an electric motor 6 having a forwardly extending output shaft 6a which is parallel with the optical axis 3, and at least one but preferably two or more sources of electrical energy here shown as batteries 7 located in the space above the motor 6 and connected in circuit therewith. The width of the motor 6 and of the batteries 7 does not exceed the width of the rear side 5b so that the distance between the lateral walls 1E, 1F of the housing 1 need not be increased due to the fact that the prime mover 6, 7 is accommodated in the rear compartment 1d in front of the rear wall 1B. In other words, the width of the housing 1 is determined by the width of the magazine 5 plus the space requirements of means for mounting the magazine in the internal space of the housing. The height of the housing 1 is determined by the height of the magazine 5 (i.e., by the length of the relatively narrow front and rear sides 5a, 5b), plus the height of the viewfinder 4 (i.e., the height of the passage 1e), plus the height of the aforementioned passage 1a between the underside 5d and the bottom wall 1D. The height of the passage 1a may be extremely small because this passage merely serves to accommodate a forwardly extending drive shaft 10 serving to connect the output shaft 6a of the electric motor 6 with a rotary shutter mechanism 15 and/or with a customary film transporting mechanism including a claw pull-down 17. The drive shaft 10 may be rotated by a reducing gearing including a pinion 8 on the output shaft 6a and a gear 9 at the rear end of the shaft 10. The shaft 10 is parallel with the optical axis 3 and its front end portion projects into the lower zone of a front compartment 1b extending between the front wall 1A of the housing 1 and the front side 5a of the magazine 5. The means for supporting the shafts 6a and 10 in the housing 1 comprises a pair of parallel vertical partitions 11 and 12 which are provided in the housing between the rear side 5b of the magazine 5 and the motor 6. These partitions also serve as bearings or supports for additional component parts which will be described hereinafter. Each of the partitions 11, 12 may be integral with the wall 1D and/or 1E.

The transmission between the output shaft 6a of the electric motor 6 and the shutter mechanism 15 comprises the aforementioned parts 8, 9 and 10, a gear 13 which is fixed to the front end portion of the drive shaft 10, and a gear 14 which is mounted in the front compartment 1b and drives the shutter mechanism. The transmission which drives the claw pull-down 17 of the film transporting mechanism includes an eccentrically mounted driver element 16 which is provided on the gear 14 and a suitable linkage 16a shown in the right-hand part of FIG. 1. The exact construction of the mechanisms 15, 17 forms no part of the present invention.

The front compartment 1b further accommodates a built-in exposure meter 18 which is disposed in the space between the front part of the viewfinder 4 and the lens 2, and a diaphragm mechanism 19 which selects the size of the diaphragm aperture in dependency on impulses produced by the exposure meter 18. The parts 13–17 are immediately adjacent to the front side 5a of the magazine.

The magazine 5 is preferably of the type having coaxial film supply and takeup means, such as a core or spool 5A driven by a further transmission which receives motion from the output shaft 6a. Certain elements of this transmission are accommodated in the chamber 1c between the partitions 11 and 12 and include a gear train 25, 26, 27, 28 (see also FIG. 3). The gear 28 meshes with a face gear or crown gear 21 which is mounted on a shaft 20 supported by the lateral wall 1E (see FIG. 2) and carries a pinion 22 meshing with a gear 23 which is coaxial with the core 5A. The gears 21–23 constitute a series of gears which receive motion from the output shaft 6a via gears 25–28, and the gears 21–23 are disposed in planes which are parallel with the lateral side 5e of the magazine 5. The gear 23 rotates the core 5A through the intermediary of a pronged driver element 24 (see FIG. 2) and a friction or like clutch 24a so that, if necessary, the gear 23 may rotate with reference to the core 5A. The prongs of the driver element 24 are automatically coupled with the core 5A when the magazine 5 is properly inserted into the housing 1. When the magazine 5 is properly accommodated in a manner as shown in FIGS. 1, 2 and the operator completes the circuit of the motor 6, the output shaft 6a drives the shaft 10 to operate the shutter mechanism 15 and claw pull-down 17. At the same time, the output shaft 6a also drives the transmission 25–28, 21–24a to rotate the core 5A whereby the core slips (friction clutch 24a) at a rate which increases proportionally with the diameter of the convoluted film thereon. If desired, the crown gear 21 and its companion pinion 22 may be produced as an integral unit, for example, by injection molding of a suitable synthetic plastic material. Certain other gears, too, may be made of synthetic plastic material.

The heretofore described distribution of various components of the movie camera contributes to a substantial reduction in the width, height and length of the housing 1. The length of the housing is determined mainly by the space requirements of the lens 2 (i.e., by the length of the front compartment 1b), by the length of the magazine 5 (between the front and rear sides 5a, 5b), by the length of the chamber 1c between the partitions 11, 12, and by the length of the remainder of the rear compartment 1d. Since the motor 6 is mounted lengthwise, its length will determine the length of the rear compartment 1d. In speaking of length, we are referring to that dimension which is measured in the direction of the optical axis 3.

In accordance with a further feature of the invention, the improved camera also comprises a frame counter which is constructed and assembled in such a way that it occupies space that is readily available in the housing 1 without necessitating an increase in the dimensions of the camera. The frame counter is best shown in FIG. 3 and comprises a rotor or drum 37 provided with indicia which can be observed through a window 37a (see FIG. 2) provided in the lateral wall 1E. The drum 37 is rigid with a ratchet wheel 36 which may be moved to and from engagement with a reciprocable driver pawl 35. The transmission which serves to reciprocate the pawl 35 is accommodated in the chamber 1c between the partitions 11, 12 and comprises a gear train including gears 29, 30 the former of which is coaxially secured to the gear 28. The gear 30 carries an eccentric stud 31 which extends into a slot 32 provided in a forked carrier 34 mounted on a pivot 33 secured to the partition 11. The carrier 34 is rigid with the pawl 35 and is caused by the stud 31 to perform rocking movements which will result in stepwise advance of the ratchet wheel 36 in the direction indicted by an arrow 48. The numeral 38 denotes a resilient blocking pawl which prevents uncontrolled anticlockwise rotation of the drum 37 under the bias of a resetting spring 39 which serves to return the drum 37 to zero position in automatic response to withdrawal of the magazine 5 from the housing 1. The drum 37 is rotatable on a spindle 38a which is mounted on the upper arm of a two-armed lever 40 and is movable to and from an operative position. In its operative position, the spindle 38a maintains the teeth of the ratchet wheel 36 in engagement with the pawls 35 and 38 so that the drum 37 may be rotated in response to operation of the motor 6. A torsion spring 42 serves to bias the spindle 38a to its inoperative position in which the ratchet wheel 36 is moved away from the pawls 35, 38 and the resetting spring 39 is free to turn the drum 37 back to zero position. The lever 40 is rockably mounted on a shaft 41 which is secured to the partition 11 and/or 12, and the lower arm of this lever carries a stop 43 which cooperates with a stop 44 mounted on the housing 1 and serving to arrest the spindle 38a in its inoperative position. The lower arm of the lever 40 further carries a motion transmitting extension or leg 45a provided with a motion transmitting pin 45 which is engaged by the lateral side 5e of the magazine 5 when the latter is properly inserted in a direction as indicated in FIG. 3 by an arrow 46. Such insertion of the magazine 5 results in a counterclockwise angular displacement of the lever 40 (see the arrow 47 in FIG. 3) and causes the ratchet wheel 36 to move two of its teeth into engagement with the pawls 35, 38 so that the frame counter is ready for use. When the motor 6 is started, the pawl 35 reciprocates or orbits at a rate which is required to count the number of exposed film frames in synchronism with the operation of the shutter mechanism 15 and claw pull-down 17. The spring 39 stores energy in response to intermittent rotation of the ratchet wheel 36 (arrow 48 in FIG. 3), but is free to release such energy and to reset the drum 37 to zero position as soon as the magazine 5 is withdrawn, i.e., as soon as the lever 40 is free to follow the bias of the torsion spring 42 and to move the spindle 38a to inoperative position in which the wheel 36 is disengaged from the pawls 35, 38. The stops 43, 44 then maintain the spindle 38a in such inoperative position until the operator decides to insert a fresh film magazine.

The carrier 34, the lever 40, the gears 29, 30 and the remaining parts of the frame counter and transmission therefor may be made of thin flat stock so that they occupy a minimum of space and may be readily accommodated in the chamber 1c between the partitions 11 and 12.

FIG. 4 illustrates certain component parts of a slightly modified movie camera which differentiates from the camera of FIGS. 1-3 in that the front compartment 101b of the housing 101 accommodates a zoom lens 102. The rear compartment 101d accommodates the motor 6 and batteries 7 as well as a second prime mover including an electric motor 106 which serves to change the focal length of the zoom lens 102. The operative connection between the motor 106 and lens 102 comprises an elongated drive shaft 110 which is shown as being mounted in the upper passage 101e for the viewfinder 4. However, it is equally possible to mount the shaft 110 in the lower passage 101a so that the latter then accommodates the shafts 10 and 110. The drive 110a between the output shaft of the motor 106 and the shaft 110 may comprise a set of bevel gears or the like.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a portable motion picture camera, a combination comprising a flat housing including two side walls interconnected by a front wall, a rear wall, top wall means and bottom wall means, said housing defining front and rear compartments respectively adjacent to said front and rear walls and a magazine-receiving space between said compartments; a magazine located in said space between said compartments and including two side walls interconnected by a front wall, a rear wall, top wall means and bottom wall means, one of said wall means of said magazine being flat and being spaced from one of said wall means of said flat housing so as to form with said one wall means of said flat housing an elongated passage extending from said rear compartment to said front compartment; mechanisms including shutter actuating means and film transporting means located in said front compartment and including a driven portion; an electric motor located in said rear compartment and including a driving portion; and drive shaft means located in said elongated passage between said flat wall means of said magazine and said one wall means of said flat housing and connected at one end to said driving portion in said rear compartment and at the other end to said driven portion in said front compartment.

2. A combination as defined in claim 1, further comprising a film frame counter installed in said rear compartment and an operative connection between said frame counter and said motor.

3. A combination as defined in claim 1, further comprising a source of electrical energy for said motor, said source including at least one battery and being installed in one of said compartments, the width of said motor— as considered transversely of said front and rear walls— being at least equal to the width of said source.

4. A combination as defined in claim 1, further comprising a viewfinder provided in said housing at a level above said space.

5. A combination as defined in claim 1, wherein said magazine has coaxial film supply and takeup means and further comprising lens means supported by said housing in the region of said front wall, said front and rear walls being substantially normal to the optical axis of said lens means.

6. A combination as defined in claim 1, further comprising second transmission means connecting the takeup means of said magazine with said motor, said second transmission means comprising a portion located between said magazine and one of said side walls and the width of said magazine exceeding half the distance between said side walls.

7. A combination as defined in claim 1, wherein said magazine has coaxial film supply and takeup means and further comprising second transmission means for connecting the takeup means of said magazine with said motor, a portion of said second transmission means being installed in said rear compartment.

8. A combination as defined in claim 1, further comprising lens means supported by said housing in the region of said front wall, said lens means being adjustable in the direction of the optical axis and further comprising a second electric motor installed in said rear compartment and second elongated shaft means connecting said second motor with said lens means, said second shaft means being substantially parallel with said first mentioned shaft means and said space having an upper side and a lower side and said second shaft means being adjacent to one of said sides.

9. In a movie camera, a housing having front, rear, top and bottom walls; a lens mounted in said housing in the region of said front wall; a flat film magazine removably received in said housing between said lens and said rear wall, said magazine having a rear side facing toward and spaced from said rear wall, a first additional side substantially parallel with the optical axis of said lens, and a second additional side substantially parallel with said optical axis, said first and second additional sides being respectively adjacent to said top and bottom walls and at least one of said additional sides being slightly spaced from the respective wall so as to define therewith an elongated passage extending toward said front wall; a prime mover including electric motor means and at least one source of electrical energy mounted in said housing between said rear side and said rear wall, said prime mover further including an elongated drive shaft operatively connected with said motor means and extending through said passage; a shutter mechanism and a film transporting mechanism both mounted in said housing between said magazine and said front wall; and transmission means drivingly connecting said shaft with at least one of said mechanisms.

10. A structure as set forth in claim 9, wherein said magazine has a relatively narrow front side facing toward but spaced from said front wall and wherein said transmission means is accommodated between said front side and said front wall.

11. In a movie camera, a flat housing having a narrow rear wall and a narrow front wall; a lens mounted in said housing in the region of said front wall; a flat film magazine removably received in said housing between said lens and said rear wall, said magazine comprising a transversely extending horizontal rotary core and having a narrow rear side facing toward but spaced from said rear wall; a frame counter mounted in said housing between said rear side and said rear wall; a prime mover including an electric motor and at least one battery mounted in said housing between said rear side and said rear wall, said motor having an output shaft; a first transmission operatively connecting said motor with said core; and a second transmission operatively connecting said motor with said frame counter and comprising a gear train driven by said output shaft, an eccentric driven by said gear train, a pawl reciprocated by said eccentric, and a ratchet wheel connected with said frame counter and driven by said pawl, said transmissions being mounted in said housing at least in part between said rear side and said rear wall and said frame counter comprising a spindle coaxially supporting said ratchet wheel and being movable to and from an operative position in which said ratchet wheel may be driven by said pawl in response to operation of said motor, biasing means for urging said spindle away from said operative position, and motion transmitting means for moving said spindle to operative position in response to insertion of said magazine into said housing.

12. A structure as set forth in claim 11, wherein said magazine has a lateral side extending forwardly from said rear side and arranged to actuate said motion transmitting means during insertion of the magazine into said housing, said biasing means comprising a spring and said second transmission further comprising a lever rockable about a fixed pivot axis under and against the action of said spring, said spindle and said motion transmitting means being mounted on said lever.

13. In a movie camera, a housing having front, rear, top and bottom walls; a zoom lens mounted in said housing in the region of said front wall; a flat film magazine removably received in said housing between said lens and said rear wall, said magazine having a rear side facing toward and spaced from said rear wall, a first additional side substantially parallel with the optical axis of said lens, and a second additional side substantially parallel with said optical axis, said first and second additional sides being respectively adjacent to said top and bottom walls and at least one of said additional sides being slightly spaced from the respective wall so as to define therewith an elongated passage extending toward said front wall; a first prime mover including a first electric motor and at least one source of electrical energy mounted in said housing between said rear wall and said rear side; and a second prime mover including a second electric motor mounted between said rear side and said rear wall, and an operative connection between said second motor and said lens for changing the focal length thereof, said operative connection including an elongated drive shaft extending through said passage.

References Cited

UNITED STATES PATENTS

| | | | |
|---|---|---|---|
| 3,208,685 | 9/1965 | Edwards | 352—156 X |
| 1,962,031 | 6/1934 | Porter | 352—72 |
| 2,241,231 | 5/1941 | Wittel | 352—72 |
| 3,187,340 | 6/1965 | Misawa | 352—72 |
| 3,199,117 | 8/1965 | Bolsey | 352—72 |
| 3,209,367 | 9/1965 | Heden | 352—140 |
| 3,239,301 | 3/1966 | Denk et al. | 352—72 |

FOREIGN PATENTS 545,938  10/1922  France.

NORTON ANSHER, Primary Examiner
MONROE H. HAYES, Assistant Examiner

U.S. Cl. X.R.
352—140